United States Patent
Hsu et al.

(10) Patent No.: US 11,196,366 B2
(45) Date of Patent: Dec. 7, 2021

(54) AUTOMATIC CORRECTION METHOD FOR PIN CONNECTION AND MOTOR DRIVING DEVICE

(71) Applicant: Acer Incorporated, New Taipei (TW)

(72) Inventors: Chu-Hsiang Hsu, New Taipei (TW); Hao-Ming Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 43 days.

(21) Appl. No.: 16/854,911

(22) Filed: Apr. 22, 2020

(65) Prior Publication Data
US 2021/0297017 A1   Sep. 23, 2021

(30) Foreign Application Priority Data
Mar. 19, 2020   (TW) ................................ 109109165

(51) Int. Cl.
*H02P 6/16*   (2016.01)
(52) U.S. Cl.
CPC ...................................... *H02P 6/16* (2013.01)
(58) Field of Classification Search
CPC .................... H02P 6/16; H02P 31/00
See application file for complete search history.

(56) References Cited

U.S. PATENT DOCUMENTS

2008/0252245 A1* 10/2008 Chen .................... H02P 6/16
                                                                 318/434
2014/0203749 A1*  7/2014 Wu ..................... H02P 31/00
                                                                 318/490

FOREIGN PATENT DOCUMENTS

TW            201121226           6/2011

* cited by examiner

*Primary Examiner* — Cortez M Cook
(74) *Attorney, Agent, or Firm* — JCIPRNET

(57) ABSTRACT

An automatic correction method for a pin connection and a motor driving device are provided. The automatic correction method includes: sensing a driven motor to generate a plurality of sensing results corresponding to a plurality of pin connection modes between a Hall sensor and a motor controller, and counting a number of changes of the plurality of sensing results to obtain a plurality of numbers of external interruptions corresponding to the plurality of pin connection modes; obtaining a correct pin connection mode in the plurality of pin connection modes according to the plurality of numbers of external interruptions; and operating the Hall sensor and the motor controller to be electrically coupled via the correct pin connection mode.

10 Claims, 5 Drawing Sheets

AUTOMATIC CORRECTION METHOD FOR PIN CONNECTION AND MOTOR DRIVING DEVICE

CROSS-REFERENCE TO RELATED APPLICATION

This application claims the priority benefit of Taiwan application serial no. 109109165, filed on Mar. 19, 2020. The entirety of the above-mentioned patent application is hereby incorporated by reference herein and made a part of this specification.

BACKGROUND OF THE INVENTION

Field of the Invention

The invention relates to an automatic correction method for pin connection and a motor driving device, and more particularly, to an automatic correction method capable of automatically correcting a pin connection between a Hall sensor and a motor controller and a motor driving device.

Description of Related Art

Global oil reserves are estimated to only last forty years. The development of alternative fuels, sustainable energy, and related dynamic drive controls should be the main object of development that requires immediate attention and may not be ignored. Therefore, the development of electric vehicles such as electric bicycles and electric motorcycles is one of the main development projects for transportation in the future. In order for the motor of the electric vehicle to operate smoothly under high load conditions, the current rotor position of the motor needs to be accurately known to provide a high torque output of the motor. Therefore, most electric vehicles adopt a Hall sensor to obtain the rotor position of the motor.

The Hall sensor has three connection pins connected to a motor controller, and therefore the Hall sensor and the motor controller have a plurality of pin connection modes. It should be noted that only one correct pin connection mode may allow the motor controller to correctly read the value of the Hall sensor in order to control motor rotation. The other connection modes may cause the motor to be rotated irregularly, thus damaging the motor. For the average user without related technical background, there is considerable pressure in assembling a Hall sensor on their own.

SUMMARY OF THE INVENTION

The invention provides an automatic correction method and a motor driving device capable of automatically correcting a pin connection between a Hall sensor and a motor controller.

An automatic correction method of the invention is suitable for correcting a pin connection between a Hall sensor and a motor controller for driving a motor. The automatic correction method includes the following steps. A pin connection combination table of the Hall sensor and the motor controller is obtained, wherein the pin connection combination table has a plurality of pin connection modes between the Hall sensor and the motor controller. The motor driven by the motor controller is sensed via the Hall sensor to generate a plurality of sensing results corresponding to a plurality of pin connection modes, and a number of changes of the plurality of sensing results is counted via the motor controller to obtain a plurality of numbers of external interruptions corresponding to the plurality of pin connection modes. A correct pin connection mode in the plurality of pin connection modes is obtained according to the plurality of numbers of external interruptions. The Hall sensor and the motor controller are operated to be electrically coupled via the correct pin connection mode.

A motor driving device of the invention is suitable for operating a motor. The motor driving device includes a Hall sensor, a path switcher, and a motor controller. The Hall sensor is configured to sense a driven motor to generate a plurality of sensing results corresponding to a plurality of pin connection modes. The path switcher is coupled to the Hall sensor. The path switcher is operated to provide one of the plurality of pin connection modes. The motor controller is electrically coupled to the Hall sensor. The motor controller is configured to obtain a pin connection combination table of the Hall sensor and the motor controller, wherein the pin connection combination table has the plurality of pin connection modes between the Hall sensor and the motor controller. The motor controller receives the plurality of sensing results and counts a number of changes of the plurality of sensing results to obtain a plurality of numbers of external interruptions corresponding to the plurality of pin connection modes. The motor controller obtains a correct pin connection mode in the plurality of pin connection modes according to the plurality of numbers of external interruptions, and operates the path switcher to electrically couple the Hall sensor and the motor controller via the correct pin connection mode.

Based on the above, the automatic correction method and the motor driving device of the invention count the number of changes of the sensing results corresponding to the plurality of pin connection modes to obtain the plurality of numbers of external interruptions corresponding to the plurality of pin connection modes, and accordingly obtain the correct pin connection mode in the plurality of pin connection modes. In the automatic correction method and the motor driving device of the invention, the Hall sensor and the motor controller are operated to be electrically coupled via the correct pin connection mode. In this way, in the invention, the pin connection between the Hall sensor and the motor controller may be automatically corrected.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
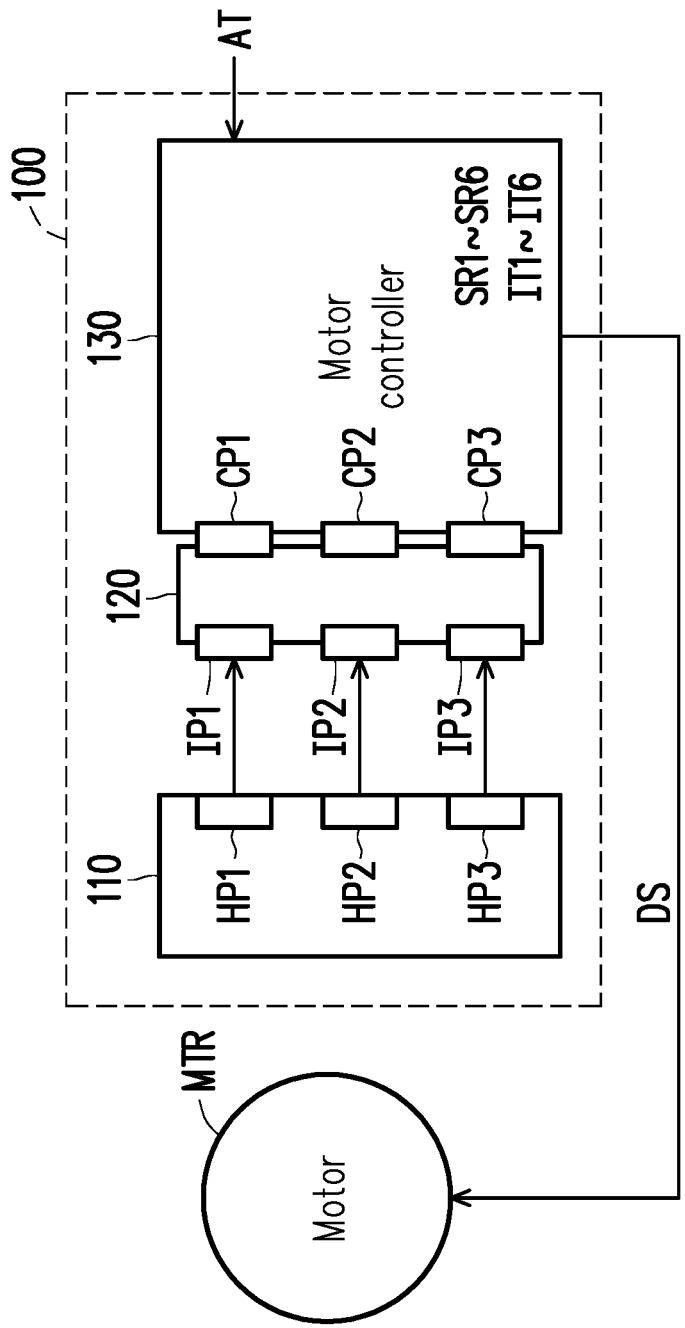
FIG. 1 is a diagram of a motor driving device shown according to an embodiment of the invention.
Figure 2:
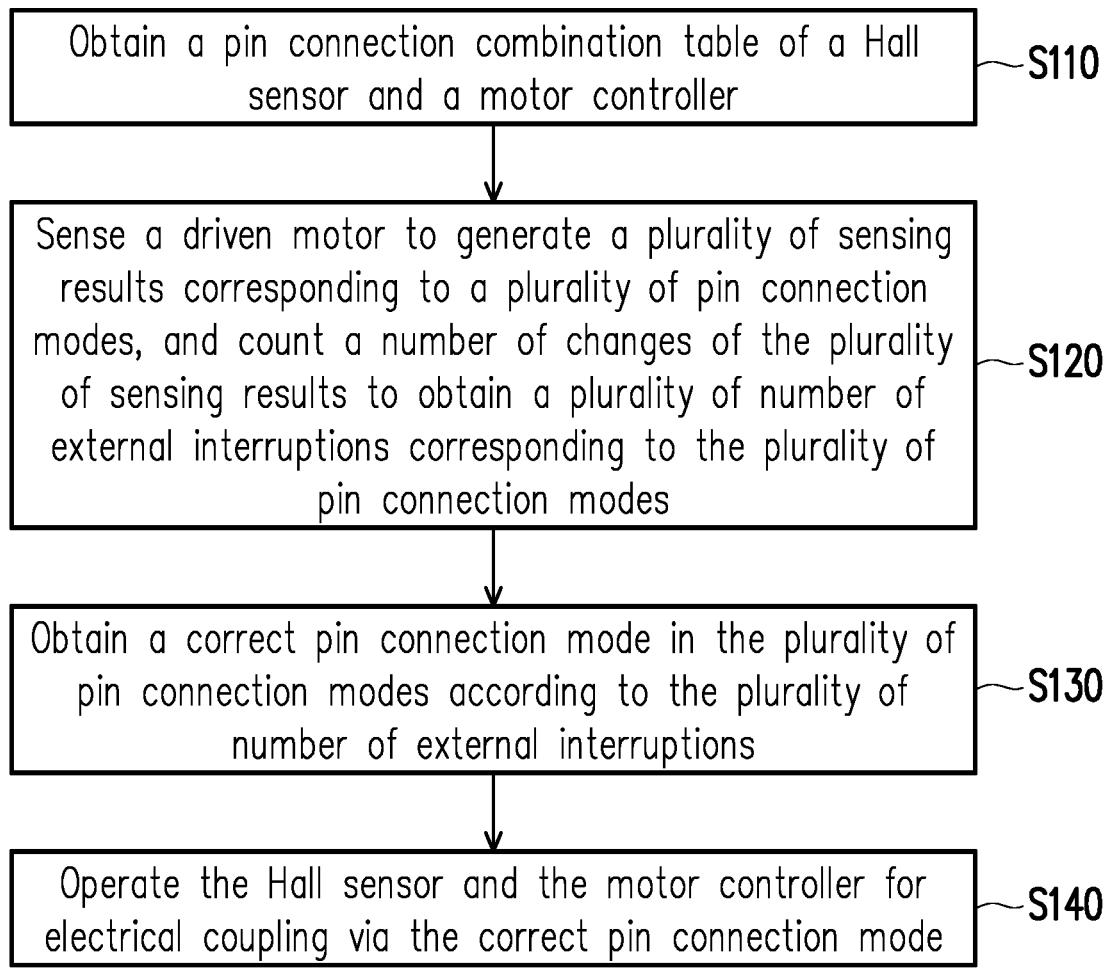
FIG. 2 is a flowchart of an automatic correction method shown according to an embodiment of the invention.

Please refer to both FIG. 1 and FIG. 2. FIG. 1 is a diagram of a motor driving device shown according to an embodiment of the invention. FIG. 2 is a flowchart of an automatic correction method shown according to an embodiment of the invention. In the present embodiment, a motor driving device 100 is suitable for operating a motor MTR. The motor driving device 100 includes a Hall sensor 110, a path switcher 120, and a motor controller 130. The Hall sensor 110 senses the driven motor MTR and provides corresponding sensing results SR1 to SR6. The path switcher 120 is coupled to the Hall sensor 110. The path switcher 120 is operated to provide one of a plurality of pin connection modes. The motor controller 130 is coupled to the path switcher 120. The motor controller 130 receives the sensing results SR1 to SR6, and drives the motor MTR according to the sensing results SR1 to SR6. In the present embodiment, the motor controller 130 provides a driving signal DS to drive the motor MTR.

In the present embodiment, the Hall sensor 110 has pins HP1, HP2, and HP3. The path switcher 120 has pins IP1, IP2, and IP3. The pins HP1, HP2, and HP3 of the Hall sensor 110 are coupled to the input pins IP1, IP2, and IP3 of the path switcher 120. The output pins of the path switcher 120 are pins CP1, CP2, and CP3 of the motor controller 130, respectively. The path switcher 120 is controlled by the motor controller 130 to provide one of a plurality of pin connection modes.

In the present embodiment, the motor driving device 100 is suitable for an automatic correction method. In step S110, the motor controller 130 obtains a pin connection combination table AT of the Hall sensor 110 and the motor controller 130.

To further explain, the pin connection combination table AT is shown in Table 1.

TABLE 1

| Pin connection mode | Pin HP1 of Hall sensor | Pin HP2 of Hall sensor | Pin HP3 of Hall sensor | Result of pin connection mode (HP1-HP2-HP3) |
|---|---|---|---|---|
| Index1 | CP1 | CP2 | CP3 | CP1-CP2-CP3 |
| Index2 | CP1 | CP3 | CP2 | CP1-CP3-CP2 |
| Index3 | CP2 | CP1 | CP3 | CP2-CP1-CP3 |
| Index4 | CP2 | CP3 | CP1 | CP1-CP3-CP1 |
| Index5 | CP3 | CP2 | CP1 | CP3-CP2-CP1 |
| Index6 | CP3 | CP1 | CP2 | CP3-CP1-CP2 |

The pin connection combination table AT has a plurality of pin connection modes between the Hall sensor 110 and the motor controller 130 (such as pin connection modes Index1 to Index6 in Table 1). The pin connection combination table AT has a switching sequence of six different pin connection modes related to the Hall sensor 110 and the motor controller 130. The Hall sensor 110 has three pins, so there are six different pin connection modes between the Hall sensor 110 and the motor controller 130. Taking the pin connection mode Index1 as an example, the pin HP1 of the Hall sensor 110 is connected to the pin CP1 of the motor controller 130, the pin HP2 of the hall sensor 110 is connected to the pin CP2 of the motor controller 130, and the pin HP3 of the hall sensor 110 is connected to the pin CP3 of the motor controller 130. Taking the pin connection mode Index2 as an example, the pins HP1, HP2, and HP3 of the Hall sensor 110 are respectively connected to the pins CP1, CP3, and CP2 of the motor controller 130.

In the present embodiment, the motor controller 130 obtains the pin connection mode of the Hall sensor 110 and the motor controller 130. The motor controller 130 obtains the pin connection mode of the Hall sensor 110 and the motor controller 130 in a general-purpose input/output (GPIO) manner, for example. The motor controller 130 controls the path switcher 120 according to the pin connection combination table AT to provide one of a plurality of pin connection modes (such as Index1 to Index6 in Table 1).

In step S120, the hall sensor 110 senses the motor MTR driven by the motor controller 130, thereby generating the sensing results SR1 to SR6 corresponding to the six pin connection modes. For example, the Hall sensor 110 corresponds to the sensing result SR1 of the first pin connection mode in the six pin connection modes. The Hall sensor 110 corresponds to the sensing result SR2 of the second pin connection mode in the six pin connection modes, and so on. In addition, in step S120, the motor controller 130 receives the sensing results SR1 to SR6 and counts the number of changes of the sensing results SR1 to SR6 to obtain numbers of external interruptions IT1 to IT6 corresponding to the six pin connection modes. For example, the number of external interruptions IT1 is the number of changes of the sensing result SR1 of the first pin connection mode. The number of external interruptions IT2 is the number of changes of the sensing result SR2 of the second pin connection mode, and so on.

In step S130, the motor controller 130 obtains the correct pin connection mode in the six pin connection modes according to the numbers of external interruptions IT1 to IT6.

In the present embodiment, when the motor MTR is driven to rotate in a fixed rotation direction (for example, clockwise rotation direction), the motor controller 130 may obtain a fixed sensing result as shown in Table 2.

TABLE 2

| Motor status | Sensing result |
|---|---|
| First status | 001 |
| Second status | 011 |
| Third status | 010 |
| Fourth status | 110 |
| Fifth status | 100 |
| Sixth status | 101 |

When the Hall sensor 110 and the motor controller 130 are connected via a correct pin connection mode, the motor status is changed periodically and sequentially from the first status to the sixth status. For example, based on the starting position of the rotor of the motor, the motor status enters the fifth status from the fourth status, enters the sixth status from the fifth status, enters the first status from the sixth status, and so on. Therefore, the sensing result is changed from "110" to "100", from "100" to "101", from "101" to "001", and so on. When the Hall sensor 110 and the motor controller 130 are connected via a correct pin connection mode, the motor MTR driven by the motor controller 130 runs smoothly. The number of changes of the sensing result of the correct pin connection mode is greater. In other words, the number of external interruptions corresponding to the correct pin connection mode is greater.

Moreover, when the Hall sensor 110 and the motor controller 130 are connected via an incorrect pin connection mode, the motor MTR is abnormal in at least one motor status. For example, in the case of an incorrect pin connection mode, the Hall sensor 110 senses that the motor status jumps from the fourth status to the sixth status. Such a sensing result is obviously incorrect, and the motor MTR is driven by mistake in the wrong sixth status. The motor MTR is operated irregularly starting from the wrong sixth status. The number of changes of the sensing result of the incorrect pin connection mode is less. In other words, the number of external interruptions corresponding to the incorrect pin connection mode is less. Therefore, the motor controller 130 uses the pin connection mode corresponding to the highest number of external interruptions in the numbers of external interruptions as the correct pin connection mode.

In step S140, the motor controller 130 operates the path switcher 120 to electrically couple the Hall sensor 110 and the motor controller 130 via the correct pin connection mode. In this way, the motor driving device 100 may automatically correct the pin connection mode between the Hall sensor 110 and the motor controller 130.

Figure 3A:
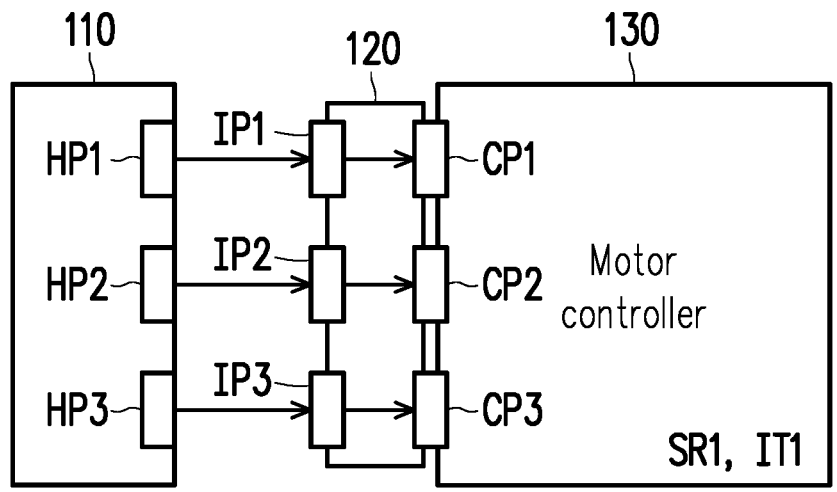
FIG. 3A, FIG. 3B, and FIG. 3C are diagrams of a usage scenario of a motor driving device shown according to an embodiment of the invention, respectively.
Figure 3B:
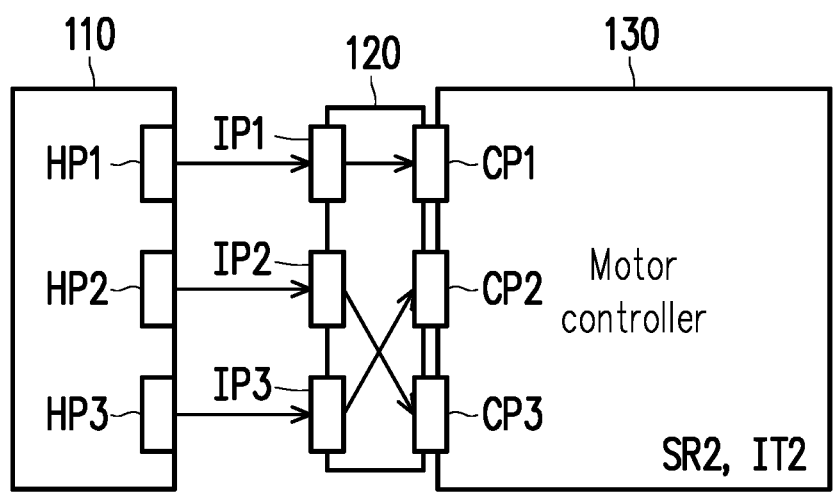
Figure 3C:
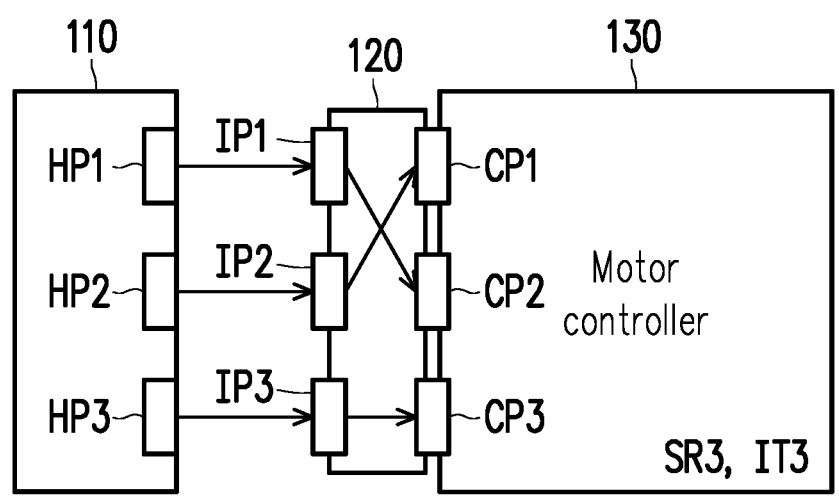

To illustrate the implementation details of steps S120 to S140 of FIG. 2 by way of example, please refer to FIG. 2, FIG. 3A, FIG. 3B, FIG. 3C, and Table 1 at the same time. FIG. 3A, FIG. 3B, and FIG. 3C are diagrams of a usage scenario of a motor driving device shown according to an embodiment of the invention, respectively. In step S120 of the present embodiment, the pins HP1, HP2, and HP3 of the hall sensor 110 are, for example, respectively connected to the input pins IP1, IP2, and IP3 of the path switcher 120. As shown in FIG. 3A, since the path switcher 120 is operated to connect the input pin IP1 to the pin CP1 of the motor controller 130, the input pin IP2 is connected to the pin CP2 of the motor controller 130, and the input pin IP3 is connected to the pin CP3 of the motor controller 130. Therefore, the pin HP1 of the hall sensor 110 is connected to the pin CP1 of the motor controller 130, the pin HP2 of the hall sensor 110 is connected to the pin CP2 of the motor controller 130, and the pin HP3 of the hall sensor 110 is connected to the pin CP3 of the motor controller 130. That is to say, the Hall sensor 110 and the motor controller 130 are connected via the first pin connection mode (such as the pin connection mode Index1 in Table 1) in the six pin connection modes. The motor controller 130 may also learn that the Hall sensor 110 and the motor controller 130 are connected via the pin connection mode Index1 in Table 1.

The Hall sensor 110 senses the driven motor based on the driving time length, thereby generating the first sensing result SR1 corresponding to the first pin connection mode. The motor controller 130 counts the number of changes of the first sensing result SR1 to obtain the number of external interruptions IT1 corresponding to the first pin connection mode. In the present embodiment, the driving time length may be set to 5 seconds (however, the invention is not limited thereto). That is, when the test is started, the motor driving device 100 performs timing and generates the sensing result SR1 corresponding to the first pin connection mode based on the driving time length, and counts the number of changes of the sensing result SR1. Once the timer reaches the driving time length, the motor driving device 100 stops generating the sensing result SR1 and stops counting the number of changes of the sensing result SR1. Therefore, the motor driving device 100 obtains the number of external interruptions IT1 of the driving time length.

It is worth mentioning here that once the timer reaches the driving time length, the motor driving device 100 stops driving the motor. In this way, when the first pin connection mode is an incorrect pin connection mode, the motor may be prevented from being damaged due to irregular operation for a long time.

After the number of external interruptions IT1 is obtained, the motor controller 130 operates the path switcher 120 based on the switching sequence. Since the path switcher 120 is operated to connect the input pin IP1 to the pin CP1 of the motor controller 130, connect the input pin IP2 to the pin CP3 of the motor controller 130, and connect the input pin IP3 to the pin CP2 of the motor controller 130, as shown in FIG. 3B, the pin HP1 of the hall sensor 110 is connected to the pin CP1 of the motor controller 130, the pin HP2 of the hall sensor 110 is connected to the pin CP3 of the motor controller 130, and the pin HP3 of the hall sensor 110 is connected to the pin CP2 of the motor controller 130. In other words, the pin connection mode of the Hall sensor 110 and the motor controller 130 is switched from the first pin connection mode to the second pin connection mode (such as the pin connection mode Index2 in Table 1) for connection. The Hall sensor 110 senses the driven motor based on the driving time length, thereby generating the sensing result SR2 corresponding to the second pin connection mode. The motor controller 130 counts the number of changes of the sensing result SR2 to obtain the number of external interruptions IT2 corresponding to the second pin connection mode.

Next, the motor controller 130 operates the path switcher 120 based on the switching sequence. Since the path switcher 120 is operated to connect the input pin IP1 to the pin CP2 of the motor controller 130, connect the input pin IP2 to the pin CP1 of the motor controller 130, and connect the input pin IP3 to the pin CP3 of the motor controller 130, as shown in FIG. 3C, the pin HP1 of the hall sensor 110 is connected to the pin CP2 of the motor controller 130, the pin HP2 of the hall sensor 110 is connected to the pin CP1 of the motor controller 130, and the pin HP3 of the hall sensor 110 is connected to the pin CP3 of the motor controller 130. In other words, the pin connection mode of the Hall sensor 110 and the motor controller 130 is switched from the second pin connection mode to the third pin connection mode (such as the pin connection mode Index3 in Table 1) for connection. The Hall sensor 110 senses the driven motor based on the same driving time length, thereby generating the sensing result SR3 corresponding to the third pin connection mode. The motor controller 130 counts the number of changes of the third sensing result SR3 to obtain the number of external interruptions IT3 corresponding to the third pin connection mode.

Similarly, the motor controller 130 operates the path switcher 120 based on the switching sequence, thereby sequentially obtaining the numbers of external interruptions IT4 to IT6 corresponding to the fourth pin connection mode, the fifth pin connection mode, and the sixth pin connection mode.

In step S130 of the present embodiment, for example, the motor controller 130 sets the number external interruptions IT3 in the numbers of external interruptions IT1 to IT6 as the highest number of external interruptions. The motor controller 130 uses the pin connection mode corresponding to the number of external interruptions IT3 as the correct pin connection mode. Therefore, the third pin connection mode (such as the pin connection mode Index3 in Table 1) is used as the correct pin connection mode. In step S140 of the present embodiment, the motor controller 130 operates the path switcher 120 to connect the Hall sensor 110 and the motor controller 130 via the third pin connection mode, as shown in FIG. 3C.

In the present embodiment, the driving time length may be adjusted to control the overall test time length. That is, if the driving time length is set to 5 seconds, the overall test time length is about 30 seconds. If the driving time length is set to 3 seconds, the overall test time length is about 18 seconds.

Figure 4:
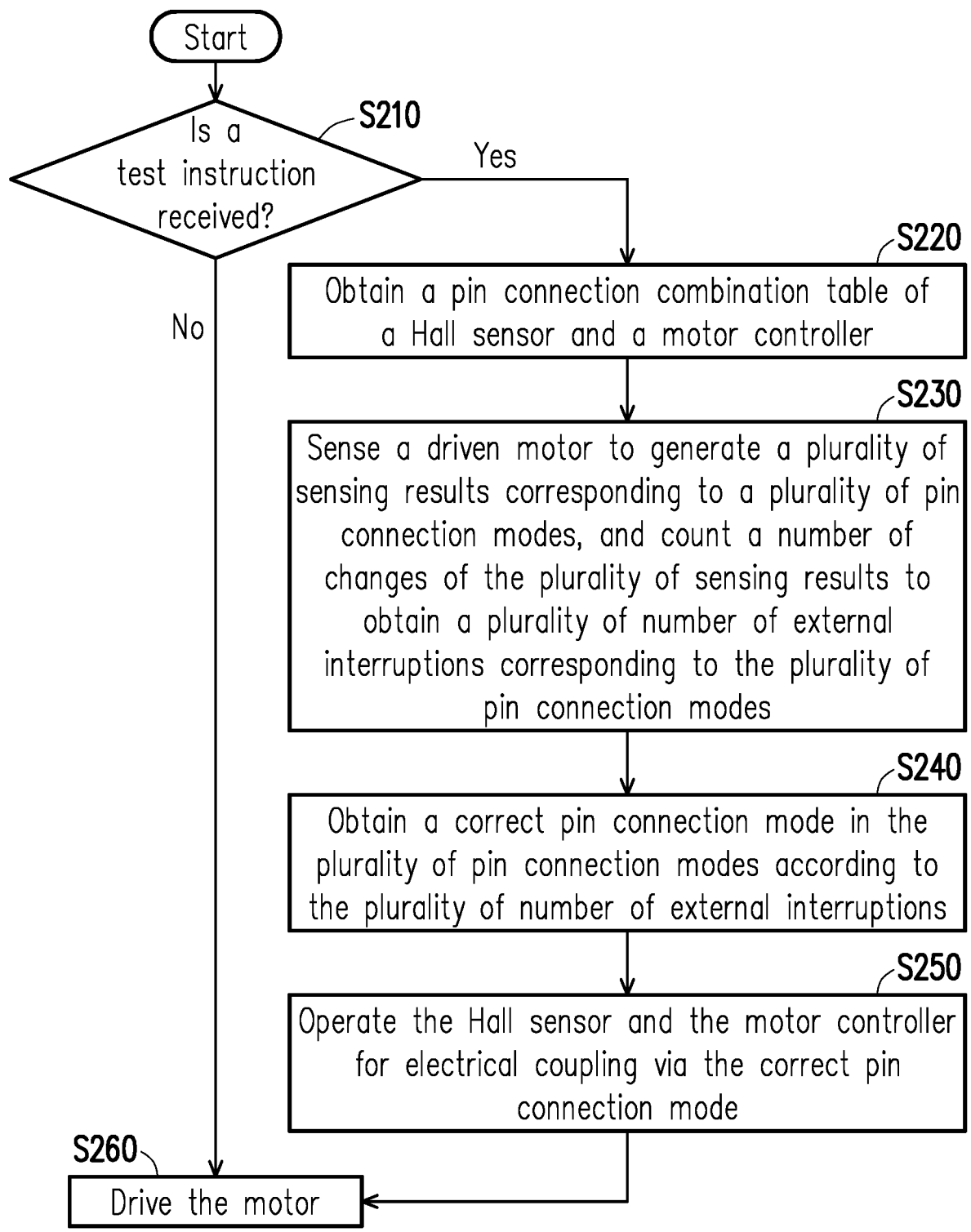
FIG. 4 is a flowchart of an automatic correction method shown according to another embodiment of the invention.

Please refer to FIG. 1 and FIG. 4 at the same time. FIG. 4 is a flowchart of an automatic correction method shown according to another embodiment of the invention. In the present embodiment, when the motor driving device 100 is turned on (i.e., started), the motor controller 130 determines whether a test instruction is received in step S210. If the motor controller 130 receives a test instruction, the automatic correction method proceeds to step S220, so as to obtain the pin connection combination table AT of the Hall sensor 110 and the motor controller 130. In step S230, the automatic correction method senses the driven motor MTR, thereby generating the sensing results SR1 to SR6 corresponding to the plurality of pin connection modes, and counts the number of changes of the sensing results SR1 to SR6 to obtain the numbers of external interruptions IT1 to IT6 corresponding to the plurality of pin connection modes. In step S240, the automatic correction method obtains the correct pin connection mode in the plurality of pin connection modes according to the numbers of external interruptions IT1 to IT6. In step S250, the Hall sensor 110 and the motor controller 130 are operated to be electrically coupled via a correct pin connection mode. Next, in a case that the Hall sensor 110 and the motor controller 130 are electrically coupled via a correct pin connection mode, the automatic correction method drives the motor MTR via the motor controller 130 in step S260. Sufficient teaching of the implementation details of steps S220 to S250 of the present embodiment may be obtained from the embodiments of FIG. 1 to FIG. 3C, and therefore details are not repeated herein.

Moreover, if the motor controller 130 does not receive the test instruction in step S210, the automatic correction mode proceeds to step S260 to drive the motor MTR via the motor controller 130.

Based on the above, in the automatic correction method and the motor driving device of the invention, the Hall sensor and the motor controller are operated to be electrically coupled via the correct pin connection mode. In this way, in the invention, the pin connection between the Hall sensor and the motor controller may be automatically corrected. In addition, in the invention, the numbers of external interruptions corresponding to various pin connection modes are obtained based on the driving time length. In this way, in the invention, the motor may be prevented from being damaged due to irregular operation for a long time.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An automatic correction method for a pin connection suitable for correcting the pin connection between a Hall sensor and a motor controller for driving a motor, the automatic correction method comprising:
   obtaining a pin connection combination table of the Hall sensor and the motor controller, wherein the pin connection combination table has a plurality of pin connection modes between the Hall sensor and the motor controller;
   sensing the motor driven by the motor controller via the Hall sensor to generate a plurality of sensing results corresponding to the pin connection modes, and counting a number of changes of the sensing results via the motor controller to obtain a plurality of numbers of external interruptions corresponding to the pin connection modes;
   obtaining a correct pin connection mode in the pin connection modes according to the numbers of external interruptions; and
   operating the Hall sensor and the motor controller for electrical coupling via the correct pin connection mode.

2. The automatic correction method of claim 1, wherein the pin connection combination table further has a switching sequence related to a plurality of pin connection modes between the Hall sensor and the motor controller.

3. The automatic correction method of claim 2, wherein the step of sensing the motor driven by the motor controller via the Hall sensor to generate the plurality of sensing results corresponding to the pin connection modes, and counting the number of changes of the sensing results to obtain the plurality of numbers of external interruptions corresponding to the pin connection modes comprises:
   electrically coupling the Hall sensor and the motor controller via a first pin connection mode in the pin connection modes;
   sensing the driven motor based on a driving time length to generate a first sensing result corresponding to the first pin connection mode; and
   counting a number of changes of the first sensing result to obtain a first number of external interruptions corresponding to the first pin connection mode.

4. The automatic correction method of claim 3, wherein the step of sensing the motor driven by the motor controller via the Hall sensor to generate the plurality of sensing results corresponding to the pin connection modes, and counting the number of changes of the sensing results to obtain the plurality of numbers of external interruptions corresponding to the pin connection modes further comprises:
   electrically coupling the Hall sensor and the motor controller via a second pin connection mode in the pin connection modes based on the switching sequence;
   sensing the driven motor based on the driving time length to generate a second sensing result corresponding to the second pin connection mode; and
   counting a number of changes of the second sensing result to obtain a second number of external interruptions corresponding to the second pin connection mode.

5. The automatic correction method of claim 1, wherein the step of obtaining the correct pin connection mode in the pin connection modes according to the numbers of external interruptions comprises:
   using a pin connection mode corresponding to a highest number of external interruptions in the numbers of external interruptions as the correct pin connection mode.

6. A motor driving device suitable for operating a motor, wherein the motor driving device comprises:
   a Hall sensor configured to sense the driven motor to generate a plurality of sensing results corresponding to a plurality of pin connection modes;
   a path switcher coupled to the Hall sensor and operated to provide one of the pin connection modes;
   a motor controller coupled to the path switcher and configured to:
      obtain a pin connection combination table of the Hall sensor and the motor controller, wherein the pin connection combination table has the pin connection modes between the Hall sensor and the motor controller,
      receive the sensing results and count a number of changes of the sensing results to obtain a plurality of numbers of external interruptions corresponding to the pin connection modes, obtain a correct pin connection mode in the pin connection modes according to the numbers of external interruptions, and operate the path switcher to electrically couple the Hall sensor and the motor controller via the correct pin connection mode.

7. The motor driving device of claim 6, wherein the pin connection combination table further has a switching sequence related to a plurality of pin connection modes between the Hall sensor and the motor controller.

8. The motor driving device of claim 7, wherein:

in a case that the Hall sensor and the motor controller are electrically coupled via a first pin connection mode in the pin connection modes, the Hall sensor is further configured to sense the driven motor based on a driving time length to generate a first sensing result corresponding to the first pin connection mode; and the motor controller is further configured to count a number of changes of the first sensing result to obtain a first number of external interruptions corresponding to the first pin connection mode.

9. The motor driving device of claim 8, wherein:

the motor controller is further configured to operate the path switcher based on the switching sequence to electrically couple the Hall sensor and the motor controller via a second pin connection mode in the pin connection modes;

the Hall sensor is further configured to sense the driven motor based on the driving time length to generate a second sensing result corresponding to the second pin connection mode; and the motor controller is further configured to count a number of changes of the second sensing result to obtain a second number of external interruptions corresponding to the second pin connection mode.

10. The motor driving device of claim 6, wherein the motor controller is further configured to use a pin connection mode corresponding to a highest number of external interruptions in the numbers of external interruptions as the correct pin connection mode.

\* \* \* \* \*